United States Patent [19]
Scott, Jr.

[11] 3,868,557
[45] Feb. 25, 1975

[54] MOTION DAMPING APPARATUS
[75] Inventor: Philip Romeo Scott, Jr., Berlin, Mass.
[73] Assignee: RCA Corporation, New York, N.Y.
[22] Filed: Oct. 13, 1972
[21] Appl. No.: 297,384

[30] Foreign Application Priority Data
Mar. 29, 1972 Great Britain.................... 14682/72

[52] U.S. Cl................................. 318/685, 318/696
[51] Int. Cl........................................... G05b 19/40
[58] Field of Search........... 318/696, 685, 138, 254, 318/439

[56] References Cited
UNITED STATES PATENTS

| | | | |
|---|---|---|---|
| 3,328,658 | 6/1967 | Thompson | 318/696 |
| 3,345,547 | 10/1967 | Dunne | 318/696 |
| 3,423,658 | 6/1969 | Barrus | 318/696 |
| 3,435,310 | 3/1969 | Bradley | 318/685 |
| 3,435,314 | 3/1969 | Bradley et al | 318/685 |
| 3,466,520 | 9/1969 | Aylikel | 318/696 |
| 3,588,661 | 6/1971 | Newell | 318/696 |
| 3,636,429 | 1/1972 | Jakubowski | 318/696 |

Primary Examiner—G. R. Simmons
Attorney, Agent, or Firm—R. E. Smiley; Edward J. Norton; H. Christoffersen

[57] ABSTRACT

The windings of a stepping motor are sequentially energized to drive the motor. A tachometer on the motor shaft produces a signal indicative of motor speed and direction which is converted to a binary signal indicative of whether or not the motor is rotating. The motor is stopped by a reverse torque braking signal produced in response to the concurrent presence of a control signal and a binary signal which indicates that the motor is rotating.

7 Claims, 4 Drawing Figures

MOTION DAMPING APPARATUS

BACKGROUND OF THE INVENTION

There are many systems in use in which a motor drives a load to a position indicated by a command signal. In the absence of special circuitry, if the motor is driven at any reasonable speed, overshoot of the desired position is certain to occur. This is followed by fairly substantial oscillations until the motor shaft comes to rest at the desired position.

Since such oscillations are generally undesirable, some form of damping is employed to reduce their amplitude or, ideally, to eliminate them completely. In the prior art, damping is accomplished by applying a backtorque signal to the motor when the shaft nears its rest position and terminating that signal when the shaft is at that position. The backtorque signal is timed so that the shaft reaches its rest position just as its angular velocity reduces to zero. In practice, however, precise control is difficult to achieve in this way. The precise times at which the backtorque signal is to be applied and removed and the amplitude of this signal depends on many variables such as the motor load, its speed at the time the backtorque signal is applied and so on. Any changes in these variables, and such changes often are not predictable, without corresponding changes in the times of application and removal of the backtorque signal and/or the amplitude of this signal may result in oscillations about the final rest position. It has been found that stepping motors require different stopping times for a one step change, a two step change, and a change of three or more steps. In the prior art this has required logic to establish the number of steps the shaft is to be moved and to apply backtorque at one of three times dictated by that move. Even then oscillation about the rest position will occur if the times selected are not appropriate to the actual shaft speed and position at the time backtorque is applied.

DETAILED DESCRIPTION

Figure 1:
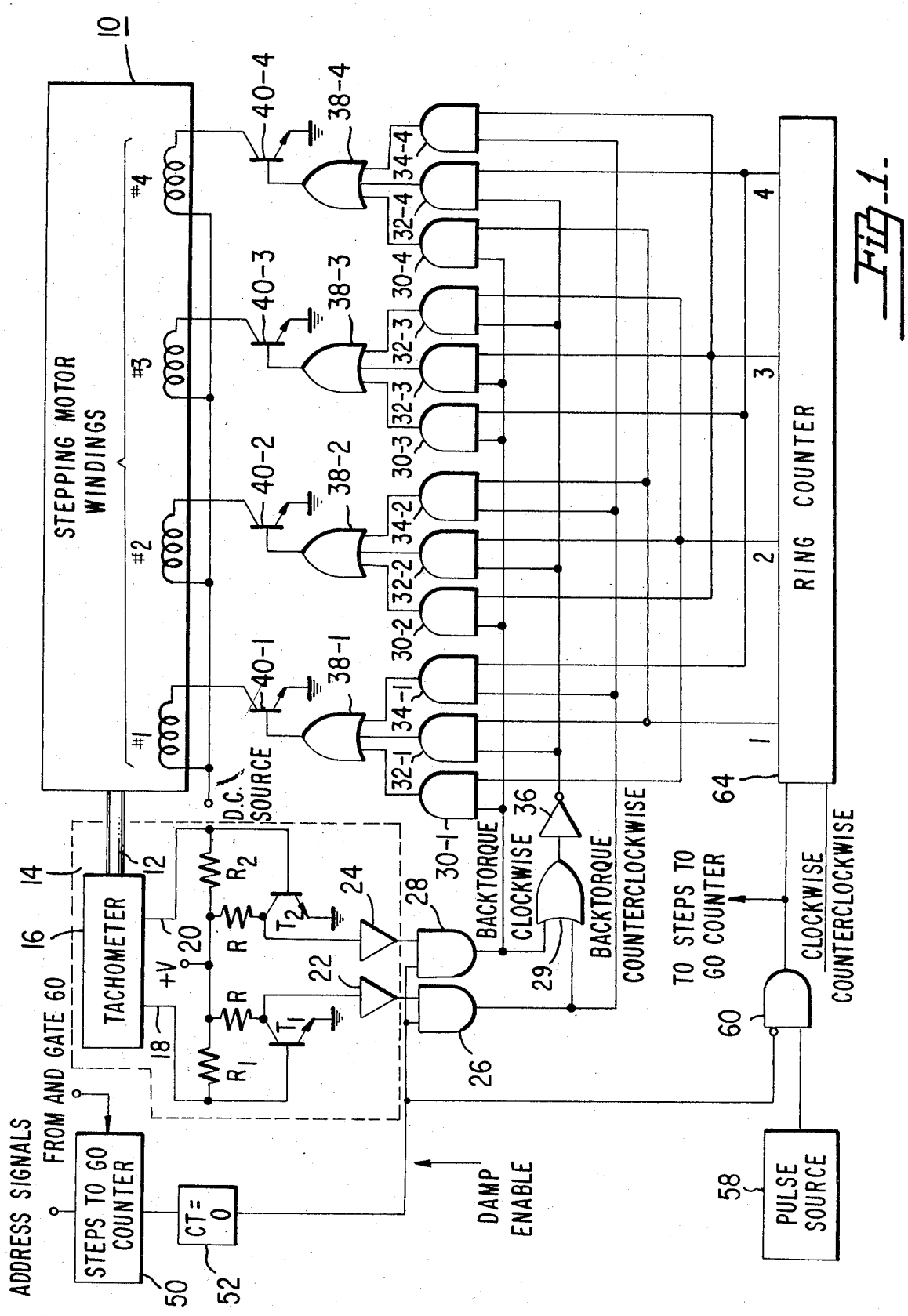
FIG. 1 is a logic and mechanical schematic of an apparatus employing the present invention.

Motor 10 illustrated schematically in FIG. 1 as a stepping motor includes a rotatable member in the form of a shaft 12, and a plurality of windings No. 1, No. 2, No. 3, No. 4. Stepping motor 10 is of the type in which, when power is applied sequentially to the windings, torque is applied to turn shaft 12. Thus, for example, if windings No. 1, No. 2, No. 3, No. 4, No. 1, etc. are energized in order, the shaft turns clockwise while if windings No. 4, No. 3, No. 2, No. 1, No. 4, etc. are energized in order, the shaft turns counterclockwise. Such a motor may have more or less windings than illustrated and may have many more angular positions to which it can be turned than there are windings. For example, the shaft 12 of motor 10 may be rotated to any one of 24 positions and held there by torque applied to a winding associated with that position.

Shaft 12 may be coupled to any load (not shown) for performing work and is also coupled to a means 14 (illustrated within dashed lines) for indicating shaft motion and direction, clockwise or counterclockwise. Means 14 comprises a tachometer 16 which produces across its two terminals 18 and 20 a direct voltage proportional to the speed of rotation of shaft 12. The polarity of the signal indicates in which direction shaft 12 is rotating. Terminals 18 and 20 are coupled to resistors $R_1$ and $R_2$ respectively and to the bases of NPN transistors $T_1$ and $T_2$ respectively. Each of the transistors is coupled to a source of reference potential, such as ground, at its emitter and to a source of potential $+V$ at its collector through a resistor R. The collectors are also coupled to high gain amplifiers 22 and 24 respectively. Amplifiers 22 and 24 are coupled respectively to one input of AND gates 26 and 28. The output terminal of AND gate 26, legended BACKTORQUE COUNTERCLOCKWISE is coupled to an OR gate 29 and to a plurality of AND gates 34-1, 34-2, ... 34-4. Likewise, the output terminal of AND gate 28, legended BACKTORQUE CLOCKWISE is coupled to OR gate 29 and to a plurality of AND gates 30-1, 30-2, ... 30-4. The output of OR gate 29 is coupled through inverter 36 to a plurality of AND gates 32-1, 32-2, ... 32-4.

The output of each group of AND gates 30-n, 32-n, and 34-n is coupled to an OR gate 38-n, the output of which is coupled to the base of NPN transistor 40-n, where n is an integer from 1 to 4 relating to a winding number. For example, AND gates 30-1, 32-1, and 34-1 are coupled to OR gate 38-1. The output of the OR gate is coupled to the base of a transistor 40-1, the collector of which is coupled to winding No. 1. A source of potential (not shown) is coupled between one end of each of the windings and the emitter of all transistors 40.

Steps-to-go counter 50, shown at the upper left corner of FIG. 1a, is adapted to receive ADDRESS SIGNALS from a source (not shown) such as a digital computer. Counter 50 is a conventional type decrementing counter which has a count jammed into its registers corresponding to the number of steps shaft 12 is to turn and is decremented by one each time a pulse is received at the terminal labeled FROM AND GATE 60. A decoder 52 is also coupled to counter 50 to produce a signal when a counter is at a count of zero. The output of decoder 52, labeled DAMP ENABLE is coupled to the second input of AND gates 26 and 28.

Decoder 52 and a pulse source 58 are coupled respectively to an inversion and a normal input terminal of AND gate 60, the output of which is coupled to the steps-to-go counter 50. Pulse source 58, which may be an oscillator, produces short duration pulses at a rate determined by the rate at which shaft 12 is to be rotated. Gate 60 and a CLOCKWISE-COUNTERCLOCKWISE signal (which may come from the same source that supplies ADDRESS SIGNALS) are coupled to a counter 64 such as a ring counter. The signal from AND gate 60 controls the rate at which the counter is advanced while the CLOCKWISE-COUNTERCLOCKWISE signal controls the direction. Counter 64 has one output for each winding, the outputs being numbered to correspond thereto. Output 1 is coupled to an input of AND gate 32-1, to a gate 34 which has the next higher dash number corresponding to the next higher winding number (i.e., gate 34-2) and to a gate 30 which has the next lower dashed number corresponding to the next lower winding number (i.e., gate 30-4, because winding No. 4 preceeds winding No. 1). The other outputs are similarly coupled.

Figure 2A:
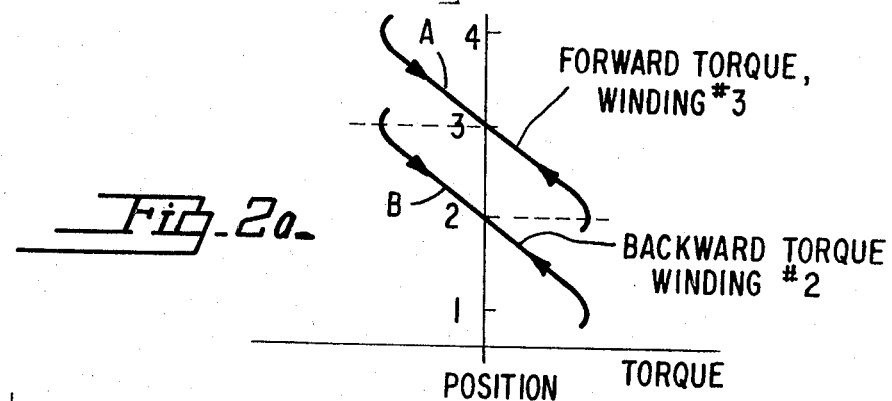
FIG. 2a is a torque diagram useful in understanding the apparatus of FIG. 1.
Figure 2B:
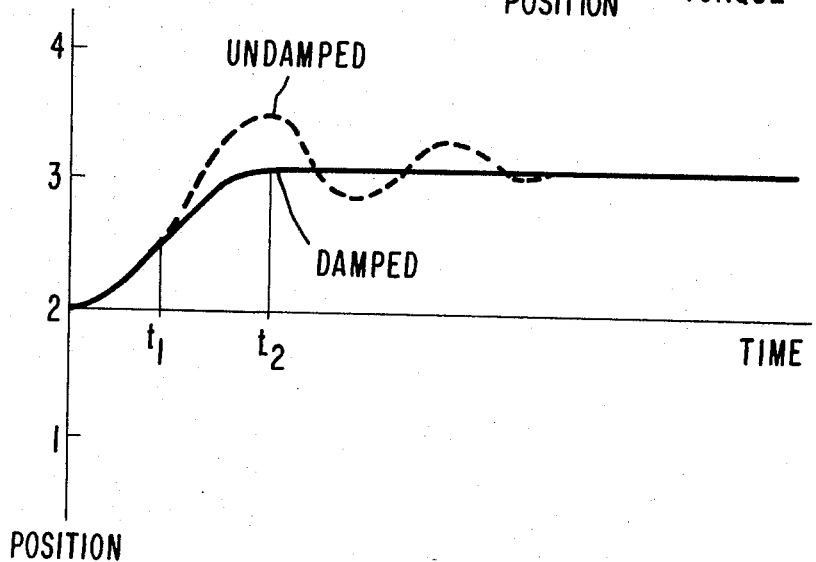
FIG. 2b is a waveform useful in understanding the apparatus of FIG. 1.

Operation of the apparatus of FIG. 1 will be better understood by referring also to FIG. 2a which illustrates the torque on shaft 12 for a selected position and to FIG. 2b which shows the position of shaft 12 with respect to time. There, the shaft is assumed to be moved from a position 2 which may correspond to winding No. 2 to position 3 corresponding to winding No. 3 (FIG. 1) by means of removing power to winding No. 2 and applying power to winding No. 3. With no damping, the shaft will follow the dashed line legended UNDAMPED (FIG. 2b) having the amount of torque applied as illustrated in FIG. 2a waveform A. That is, the shaft moves beyond position 3, then reverses towards position 2, finally coming to rest after several oscillations at position 3.

Such oscillations are often desirable. In the prior art a signal is applied at time $t_1$ to a winding preceeding (when considering shaft rotation) the winding corresponding to the position to which the shaft is being rotated for the purpose of providing backtorque while the winding associated with the intended shaft position is de-energized. The torque on shaft 12 is then as illustrated in waveform B, FIG. 2a. Then at time $t_2$ when, ideally, the shaft has just reached position 3 and its angular velocity has just reduced to zero, the backtorque signal is removed. The problem is that the shaft may not have reached position 3 at time $t_2$ or may still be in motion. That is, it may be on one side of position 3 so that when the backtorque signal is removed the shaft will still oscillate until it finally comes to rest at position 3. Such an error in timing, which causes the shaft not to be at rest at the desired position at time $t_2$, may be caused by load variations on the shaft, frictional variations in the motor or load, electrical differences between motor windings, or the shaft being moved different numbers of steps which result in different shaft speeds at time $t_1$.

Returning to FIG. 1 and assuming the shaft is at rest, if it is desired to rotate the shaft, address signals in the form of the number of steps the shaft is to be moved are entered into counter 50 via the terminal labeled ADDRESS SIGNALS. Assuming that the shaft is at position 1 and it is desired to move it to position 3, a count of two is jammed into the counter and a signal indicating clockwise movement is applied to the ring counter on the CLOCKWISE-COUNTERCLOCKWISE conductor. Then, because counter 50 is at a count other than zero, encoder 52 emits a logic 0 signal. This signal primes AND gate 60 (AND gates produce a logic 1 output only when all inputs are at a logic 1 level, but due to the inverter input terminal a logic 0 appears as a logic 1 to the AND gate). Then the next logic 1 pulse from pulse source 58 momentarily enables AND gate 60 and applies a logic 1 to counter 64 and to counter 50. This pulse advances ring counter 64 from a count of 1 to a count of 2 and decrements counter 60 from a count of 2 to 1. Because decoder 52 emits a logic 0 signal, gates 26 and 28 are blocked (i.e., produce logic 0) and OR gate 29 produces a logic 0. This signal is inverted by inverter 36 which produces a logic 1 to prime gates 32-1 through 32-4. Then, because the ring counter has stepped to a count of 2 (i.e., produces a logic 1 at its output terminal labeled 2 while all other output terminals are at a logic 0), gate 32-2 is enabled and the resulting logic 1 from OR gate 38-2 saturates transistor 40-2, which acts as a switch, to energize winding No. 2. The resulting torque causes shaft 12 to rotate clockwise.

When the shaft 12 is stationary, no voltage is generated between terminals 18 and 20. The voltage +V, therefore, is applied to the bases of transistors $T_1$ and $T_2$ via resistors $R_1$ and $R_2$ respectively, and both transistors $T_1$ and $T_2$ conduct heavily. The signal developed at the collectors of these transistors is, therefore, a low level signal (e.g., ground potential) and the amplifiers 22 and 24 produce logic 0 output signals. When the shaft is rotating clockwise, the tachometer voltage present at terminal 20 is relatively negative and that present at terminal 18 is relatively positive. The relatively positive voltage at 18 has no effect on transistor $T_1$ which remains at saturation. The relatively negative voltage present at 20 causes transistor $T_2$ to conduct less heavily and can even be sufficiently low to drive transistor $T_1$ to cutoff. The result is a change in the signal level at the collector of transistor $T_2$ from ground to a positive value. Any such relatively positive signal is amplified by amplifier 24 and then clipped to a reference level representing a 1. The result is that whenever the shaft is moving clockwise at any speed above some minimum threshold speed, amplifier 24 produces a logic 1 and when the shaft is stopped or rotating counterclockwise, amplifier 24 produces a logic 0. Similarly, during counterclockwise rotation of the shaft transistor $T_1$ is driven toward cutoff and transistor $T_2$ remains in saturation. With shaft 12 rotating clockwise, AND gate 28 is primed. However, since decoder 52 is still producing logic 0, AND gate 28 remains disabled.

When the next pulse is generated by pulse source 58, nominally at a time when the shaft is at position 2 traveling at maximum or near maximum velocity, and ring counter 64 is stepped to a count of three, counter 50 is stepped to a count of zero. With the ring counter at a count of three, winding No. 2 is de-energized and winding No. 3 is energized producing torque, as illustrated in FIG. 2a, waveform A, to turn the shaft to position three. When counter 50 is at zero, decoder 52 produces a logic 1. The logic 1 disables gate 60, so that counters 50 and 64 will not decrement and advance respectively, and enables AND gate 28 (since due to clockwise shaft rotation, amplifier 24 is producing a logic 1). Therefore, with gate 28 enabled a logic 1 is applied to OR gate 29 and AND gates 30-1 ... 30-4. As a result, inverter 36 disables gates 32-1 ... 32-4. Further, the logic 1 present at output terminal 3 of the counter, which momentarily enabled gate 32-3 while priming gates 30-2 and 34-4 combined with the logic 1 from AND gate 28, now instead enables gate 30-2, driving the transistor 40-2 for winding No. 2 to saturation. The resulting signal applied by transistor 40-2 for winding No. 2 is a backtorque signal-one which tends to drive the motor counterclockwise (FIG. 2a, waveform B), and its effect is to slow down the motor and cause it to stop. Since for the before mentioned reasons it is not normally possible to stop the shaft just at the desired position, it is actually stopped short of the desired position by the apparatus of FIG. 1. When the shaft stops or almost stops, the output signal produced by the tachometer reduces to zero; AND gate 28 is disabled. This causes the gate 30-2 to become disabled and the gate 32-3 to become enabled, restoring the preexisting condition (i.e., winding No. 3 energized, winding No. 2 de-energized). With the shaft stopped or nearly stopped short of position 3 (i.e., between positions two and three) the energized winding No. 3 will again apply torque to drive the shaft clockwise. The ensuing motion results in tachometer output so that gate 28 again will become enabled to provide reverse torque. The process continues until shaft 12 reaches position 3 with negligible overshoot. From FIG. 2a it should be evident that if the shaft is near a position corresponding to winding No. 2, there is maximum forward torque when winding No. 3 is energized (waveform A), and there is minimum backward torque when winding No. 2 is energized (waveform B). Just the reverse conditions are true when the shaft is near a position corresponding to winding No. 3. This is just the condition which is desired to bring the shaft to a stop at position 3 with no overshoot. It should be noted, however, that should overshoot occur, the apparatus of FIG. 1 will recover since a reversed tachometer output will occur, causing gate 26 to be enabled to provide counterclockwise backtorque in the example just discussed. With the shaft at rest at position 3, winding No. 3 is energized to keep it there until a new command is entered into counter 50. This method automatically provides the correct damping, irrespective of the number of steps that the shaft is required to move.

The system is, of course, also capable of operating when it is desired to stop counterclockwise shaft rotation. In this case amplifier 22 produces a logic 1 to prime AND gate 26 and decoder 52 applies a logic 1 to gate 26 to enable the same when the motor gets close to its final position. This causes the BACKTORQUE COUNTERCLOCKWISE signal to be produced.

If a system is utilized which requires only one direction of shaft rotation, for example, clockwise, it is then possible to connect terminal 20 directly to amplifier 24 and connect conductor 18 to ground, thus eliminating the need for the resistors, elements $T_1$, $T_2$, 22, 26, 29, and 34-n.

Figure 3:
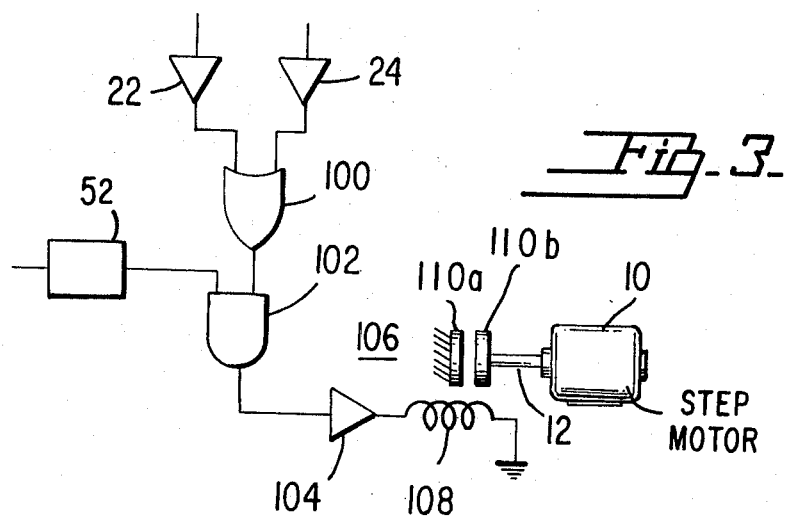
FIG. 3 is an alternate form of brake useful in the apparatus of FIG. 1.

In some activities a mechanical or magnetic brake may be more appropriate then the backtorque system illustrated in FIG. 1. Thus, in FIG. 3 amplifiers 22 and 24 from FIG. 1 are coupled to OR gate 100. The output of the OR gate and the output of decoder 52 (FIG. 1) are coupled to an AND gate 102. The output of OR gate 102 is coupled to a power amplifier 104, the output of which is coupled to a coil 108 of a magnetic brake assembly 106. The magnetic brake also includes plate 110a connected to a mechanical ground and a moving plate 110b which is attached to shaft 12 of motor 10. In this system elements 26, 28, 29, 36, 30-n, 32-n, 34-n, and 38-n are not needed. The ring counter is coupled directly to switches 40-n.

Operation is similar to that of FIG. 1 except that when a count of zero is reached in counter 50, AND gate 102 is enabled, which causes brake 106 to be energized. A winding associated with the desired rest position is also energized. Again when shaft rotation ceases, gate 102 is disabled, disabling the brake. If the shaft is not properly centered at position 3, the motor again will start up due to the energized winding No. 3 and the resultant signal from tachometer 16 again will cause energization of the brake to provide a braking action.

What is claimed is:

1. A control system for a stepping motor having a movable member and a plurality of phase windings comprising, in combination:

means for providing signals sequentially to said windings for creating torque to move said movable member;

means coupled to said movable member for producing a first signal when said movable member is in motion and a second different signal when it is stopped; and means responsive to an indication that said movable member is approaching its final step and to said first signal indicating said movable member is in motion for removing a signal from the phase winding which produces maximum torque to move said movable member to its final step and for applying a signal to a different phase winding to produce a reverse torque on said movable member only when said first signal is present whereby said movable member is stopped.

2. The combination as set forth in claim 1 further including means responsive to said second signal for causing a signal to be removed from said different phase winding and reapplied to the phase winding which produces maximum torque to move said movable member to its final step.

3. The combination as set forth in claim 1 wherein said means coupled to said movable member comprises a means for producing an electrical signal proportional to the speed of said movable member and having a unique value when said movable member is motionless and means coupled thereto for producing a first substantially constant signal when said means for producing electrical signals produces a signal other than at said unique value and for producing a second different signal when said means is producing said unique signal.

4. The combination as set forth in claim 1 wherein said movable member is movable in each of two directions and wherein said member coupled thereto produces a first signal when said movable member is moving in one direction and a second signal when said movable member is moving in the other direction and wherein the means responsive to an indication that said movable member is approaching its final step is responsive to one of said first and second signals for applying signals to a phase winding to provide reverse torque in the proper direction.

5. A control system for a stepping motor having a rotatable shaft and a plurality of phase windings for controlling the position thereof comprising, in combination:

means responsive to a signal indicating the number of steps said shaft is to be moved for applying signals sequentially to said phase windings for applying torque for rotating said shaft;

tachometer means coupled to said shaft for producing a signal of a polarity indicative of the direction of shaft movement and of an amplitude proportional to the speed of said shaft;

means responsive to the signal from said tachometer for producing a first substantially constant signal when said shaft is moving in one direction and a second substantially constant signal when said shaft is moving in the opposite direction; and means responsive to a signal indicating a phase winding is being energized for moving said shaft to its final step and to one of said first and second substantially constant signals for de-energizing said energized phase winding and for energizing a different phase winding to produce backtorque to stop the motion of said shaft.

6. The combination as set forth in claim 5 wherein said means responsive to said tachometer signals produces a third signal when said shaft ceases motion for removing said backtorque signal.

7. The combination as set forth in claim 6 further including means also responsive to said third signal for reapplying a signal to the winding which moves said shaft to said final step.

* * * * *

UNITED STATES PATENT OFFICE
CERTIFICATE OF CORRECTION

PATENT NO. : 3,868,557
DATED : February 25, 1975
INVENTOR(S) : Philip Romeo Scott, Jr.

It is certified that error appears in the above-identified patent and that said Letters Patent are hereby corrected as shown below:

Column 3, line 20, "desirable" should be --undesirable--

Signed and Sealed this second Day of September 1975

[SEAL]

Attest:

RUTH C. MASON
Attesting Officer

C. MARSHALL DANN
Commissioner of Patents and Trademarks